United States Patent
Day et al.

(10) Patent No.: US 7,072,940 B1
(45) Date of Patent: *Jul. 4, 2006

(54) SYSTEM AND METHOD FOR MANAGING COMMUNICATIONS AND COLLABORATION AMONG TEAM MEMBERS

(75) Inventors: Susan Day, Beverly Hills, MI (US); Juan De Pena, Dearborn, MI (US); Steve H Scheerhorn, Northville, MI (US); Marleen Pizzuti, Novi, MI (US); Gail Baker, Berkley, MI (US); Elaine Tumavitch, Livonia, MI (US); Michael Sobczak, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 966 days.

This patent is subject to a terminal disclaimer.

(21) Appl. No.: 09/707,118

(22) Filed: Nov. 6, 2000

Related U.S. Application Data

(60) Provisional application No. 60/225,123, filed on Aug. 14, 2000.

(51) Int. Cl.
*G06F 15/16* (2006.01)
(52) U.S. Cl. ............... 709/204; 709/225; 709/229; 707/10; 707/102; 715/762
(58) Field of Classification Search ............... 709/204, 709/225, 229; 345/751, 753, 759; 715/751, 715/753, 759, 762; 707/10, 102
See application file for complete search history.

(56) References Cited

U.S. PATENT DOCUMENTS

| | | | |
|---|---|---|---|
| 5,548,506 A | 8/1996 | Srinivasan | |
| 6,161,113 A * | 12/2000 | Mora et al. | 715/505 |
| 6,223,177 B1 * | 4/2001 | Tatham et al. | 709/225 |
| 6,295,513 B1 * | 9/2001 | Thackston | 703/1 |
| 6,338,086 B1 | 1/2002 | Curtis et al. | |
| 6,370,575 B1 * | 4/2002 | Dougherty et al. | 709/224 |
| 6,421,678 B1 | 7/2002 | Smiga et al. | |
| 6,463,460 B1 | 10/2002 | Simonoff | |
| 6,507,845 B1 | 1/2003 | Cohen et al. | |
| 6,591,278 B1 * | 7/2003 | Ernst | 709/223 |
| 6,594,664 B1 | 7/2003 | Estrada et al. | |
| 6,678,698 B1 * | 1/2004 | Fredell et al. | 707/104.1 |
| 2002/0091725 A1 * | 7/2002 | Skok | 707/501.1 |
| 2002/0194272 A1 * | 12/2002 | Zhu | 709/204 |

FOREIGN PATENT DOCUMENTS

GB    2 299 000 A    9/1996

(Continued)

OTHER PUBLICATIONS

UK Patent Office Search Report under Section 17.

(Continued)

*Primary Examiner*—Jeffrey Pwu
(74) *Attorney, Agent, or Firm*—Brooks Kushman, P.C.; Gary A. Smith

(57) ABSTRACT

A system and method is adapted to utilize the Internet as a medium for providing information and data management and sharing between diverse project team members. The project team members may be part of diverse functional organizations within one or more larger organizations, may be geographically separated, or may utilize differing information management tools to perform their work activities. Each team may have its own organization separate from the organization from which the team members are drawn. Moreover, the information and data may be financial, technical, marketing and the like.

24 Claims, 15 Drawing Sheets

FOREIGN PATENT DOCUMENTS

GB         2 313 251 A     11/1997

OTHER PUBLICATIONS

Internet printout: "Getting to Know LoveEcstasy.com" (http://www.loveecstasy.com).

Internet printout: "Cultural Studies in Cyberspace: Teaching with New Technology", ALN Magazine vol. 2, Issue 2 (Oct. 1998) (http://www.aln.org).

Search Report under Section 17, Application No. GB 0126479.5 (Aug. 21, 2002).

"Document Management Practices in a Technologically Diverse, Geographically Distributed Virtual Development Team", Kevin B. Johnson, 12th Annual Electronic Document Management Symposium, Drug Information Association, Feb. 1999, Philadelphia.

http://www.pharmaknowledge.com/whats_new.htm, © 2002, most recently.

"Relationships Between People and technology in Regulatory Information Management: Tools and Techniques for Virtual teams", Kevin B. Johnson, Drug Information Association (DIA) Annual Meeting, Jul. 1, 1999, Baltimore.

"A Web-based Virtual Room for Small Team Collaboration", Maria H. Penedo, *TRW*, Submitted to the ICSE 99, published at URL: http:sern.ucalgary.ca/~maurer/ICSE99WS/Submissions/Penedo/Penedo.html.

"TEAM: Telecollaboration Applied" The New Working Paradigm of Concurrent Virtual Enterprises in the Automotive Industry, Dipl.-Ing. Clemens M. Hauber, M.S.E.E., EUR ING. Siemens AG, Public Communication Networks Group, Marketing, Application Projects, Munich, Germany.

"TEAM-based European Automotive Manufacture (TEAM) Final Project Review Report", Project No.: AC070, Copyright 1997 by the TEAM Consortium.

* cited by examiner

1. FROM THE LEFT NAVIGATION FRAME, CLICK ON THE ITEM (TEAM CALENDAR, MEETINGS, OR DOCUMENT, ETC.) YOU WANT TO CREATE

2. SELECT ANY OF THE SUB-ITEMS (IF NECESSARY):

3. FROM THE RIGHT FRAME, CLICK ON NEW DOCUMENT (OR NEW MEETING, ETC.)

THE FORM WILL APPEAR IN THE RIGHT FRAME

FIG. 8

Documentation

114 — Save & Close | HELP | Cancel

Subject _____
Document Type — Select Document Type — 102
                100

Category(s) — Category 1
              Category 2     — 104
              ...
              Category n Associated Events — Event 1
                    Event 2
                    ...
                    Event n
                              106

Associated Subteams — Subteam 1
                      Subteam 2
                      ...
                      Subteam n
                                  108

Attached File(s) _____

Reviews
  Review Date: _____
  Review Status: _____

Select Reviewers: _____
Or select entire subteam: _____

○ Keep Active   ○ Mark Inactive on date: _____

Send E-mail Notification To:  ○ Reviewers   ○ Nobody

86 New Document Form

88 Basic Information Section
90 Content Section
92 Review Section
111 Expiration Date

FIG. 10

```
From:
Sent:
To:
Subject:           FVI Notification: Paper will not support timing (FVI Application Project)

P L E A S E   D O   N O T   R E S P O N D
T O   T H I S   E - M A I L   N O T I F I C A T I O N

The following is to inform you of activity in a TeamRoom of which you
are a
member.

Current Date:

Author:

Subject:  Paper will not support timing

Document: Issue

Priority: Green

Reviewers:

Click on the link below to view the new item:

http://www.          com/fvi/teamrooms/fviappdev.nsf/Default/1730DEBFB4
88EF15852568E10059282370penDocument
```

154 REVIEW HYPERLINK     152 EMAIL NOTIFICATION FORM

FIG. 14

Delete     Edit     HELP     Cancel

Description Profile

252 — Description Profile Name (for e-mail notification)

254 — Profile Status:

Search Method —— 256
O Match any word (or)

Keywords —— 258

New Documents by Author

New Documents by Category

New Documents by Events

New Documents Referencing Subteam

New Documents Containing Word/Phrase

New Documents Assigned to Reviewers

Discussion Threads —— 260
☐ Receive Full Thread

SUBSCRIPTION PROFILE FORM
250

FIG. 17

Roadmap Template – Action Description

302 REPORTABLE
- ○ Included in Financials  ○ Not Included in Financials — 304
- Project: _____ — 306
- Sub-Project: _____ — 308
- Name of Physical Action Description _____ — 310
- Description _____ — 312
- Action Implementation Event _____
- Date _____ — 314

Ease of Implementation
- ○ Easy  ○ Medium Difficulty  ○ Hard — 316

Status
- ○ Under Study  ○ Agreed by Team  ○ Agreed by Line Organization — 318

320 REQUIRED APPROVALS

Approval Required

| Activity | Approval |
|---|---|
|  |  |
|  |  |
|  |  |

322 PROJECT OF RECORD

Book Under Different Project
- ○ Yes (Project) _____
- ○ No

| Additional Authors | Attach Backup Files |
|---|---|
|  |  |
|  |  |
|  |  |

Document Information

| Created/Updated By: | Created/Updated Date: |
|---|---|
|  |  |

300 PHYSICAL ACTION DESCRIPTION TEMPLATE

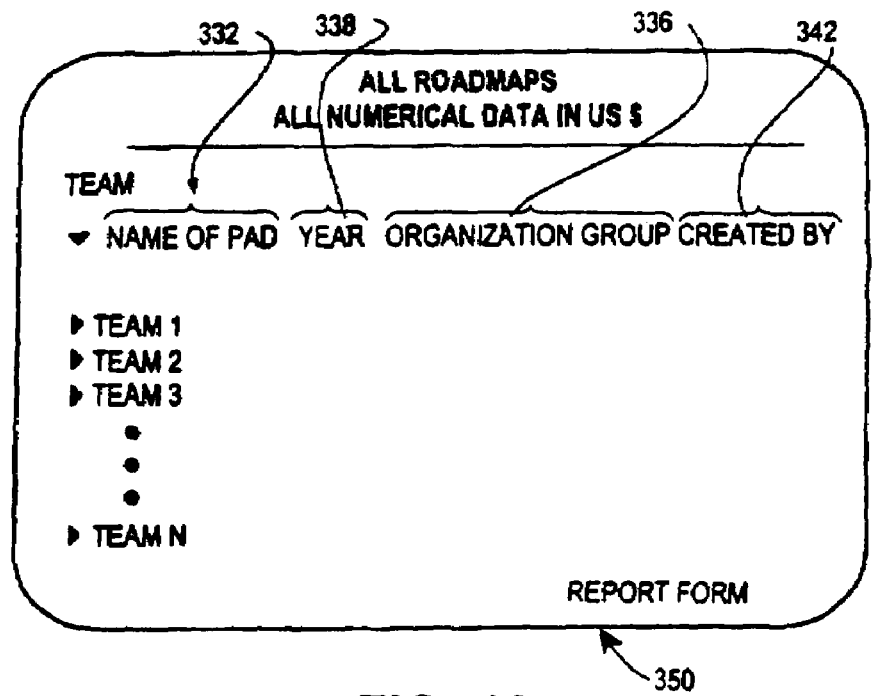
FIG. 19
FIG. 20
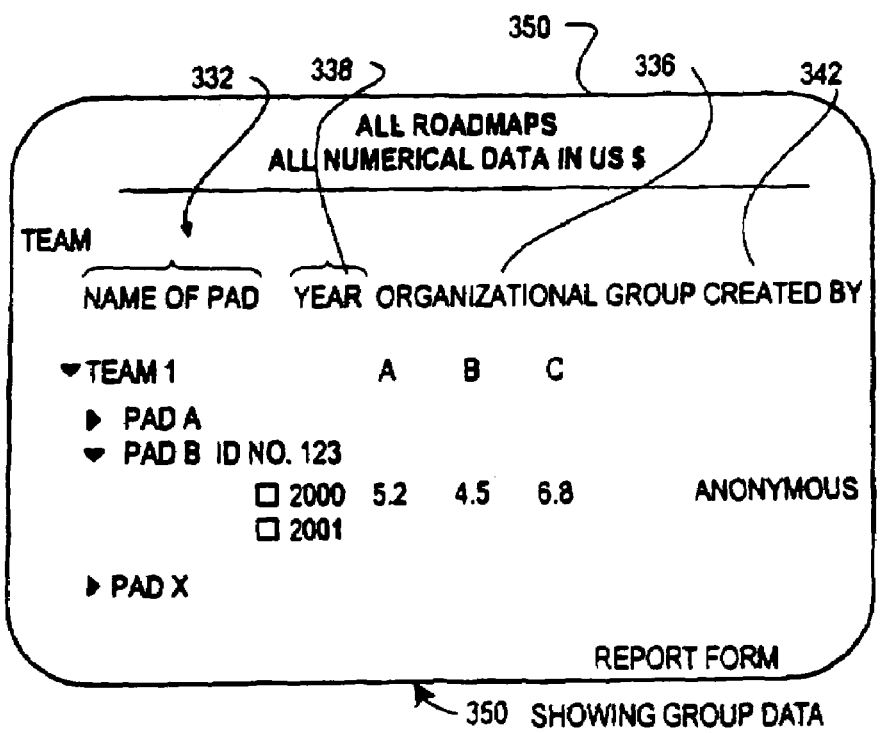

SYSTEM AND METHOD FOR MANAGING COMMUNICATIONS AND COLLABORATION AMONG TEAM MEMBERS

CROSS-REFERENCE TO RELATED APPLICATIONS

This application claims priority benefit to U.S. Provisional Patent Application Ser. No. 60/225,123, filed Aug. 14, 2000, the disclosure of which is hereby expressly incorporated herein by reference.

TECHNICAL FIELD OF THE INVENTION

The invention relates generally to managing data and information, and more particularly, to methods and apparatus for managing data and information between diverse organizations and data management systems.

DESCRIPTION OF THE RELATED ART

There are many tools available today that facilitate the sharing of information and data. For example, the use of E-mail is prevalent in the modern organization. Local and wide area network technology permits the sharing of information via shared storage areas (e.g., a global shared drive). The Internet and Intranet technologies permit the sharing of information by way of homepages and the like. There are also applications, such as the Lotus Notes and Lotus Domino applications, designed to facilitate the exchange of data and information. Other applications are known that fulfill the needs of data entry, for example spreadsheets and the like, but these applications are not designed for nor are they well suited to track information in addition to data.

Each of these tools has certain advantages and limitations, particularly when viewed in connection with project management. For example, most of these tools are discrete. That is to say, they do not effectively permit the integration of information and data. For example, E-mail carries a message and may carry additional information by way of attached files. An Internet or Intranet homepage contains information or links to information from various sources. None of the tools facilitates collaborative efforts in connection with the development and editing of the information. In most cases the integration of information and data is accomplished off-line, not in real time, and then reported using these various tools.

An additional limitation exists in that all participants in a project may not use the same tools, may not have all the necessary tools available to them or may encounter institutional limitations in their ability to use the tools they have available. For example, where two large organizations collaborate in a project, these organizations may have security restrictions that limit the project participants from accessing, using and modifying information and data retained within the various organizations' information management systems. Moreover, the organizations may use differing applications with limited or no compatibility.

The project room, i.e., a physical conference room or "war room," has been often used to assist in managing a project by providing a common area where project participants can keep and share data and information, where project tracking information may be displayed and shared, and where the project members and project managers can meet to assign tasks and to track the progress of the project. The significant limitation with the project room is that the information and data is only accessible from the project room. The project participants may not be physically co-located, and in fact, may be located on different continents and in different time zones. Online meeting tools, such as the Microsoft NetMeeting application or the Lotus Sametime application, permit the project participants to meet and confer without being co-located, but still do not provide a convenient mechanism for permitting the project participants to collaborate and share information and data or to provide notifications to project participants that there is new information and/or data available.

Thus, there is a need for a system and method for better managing the sharing of information and data and for managing the collaborative efforts of team members.

BRIEF DESCRIPTION OF THE DRAWINGS

FIG. 8 is a graphic representation of a portion of a team web page associated with documentation entry into a teamwork tool in accordance with a preferred embodiment of the invention;

FIG. 10 is a graphic representation of an issue notification;

FIG. 14 is a graphic representation of a portion of a team web page associated with a subscription feature of a teamwork tool in accordance with a preferred embodiment of the invention;

FIG. 17 is a graphic representation of a portion of team web page associated with the creation of a physical activity description within a teamwork tool in accordance with a preferred embodiment of the invention;

FIG. 19 is a graphic representation of a portion of team web page associated with the reporting of data from within the teamwork tool in accordance with a preferred embodiment of the invention;

FIG. 20 is a graphic representation of a portion of team web page associated with an alternate reporting of data within the teamwork tool in accordance with a preferred embodiment of the invention;

DETAILED DESCRIPTION OF THE PREFERRED EMBODIMENTS

Figure 1:
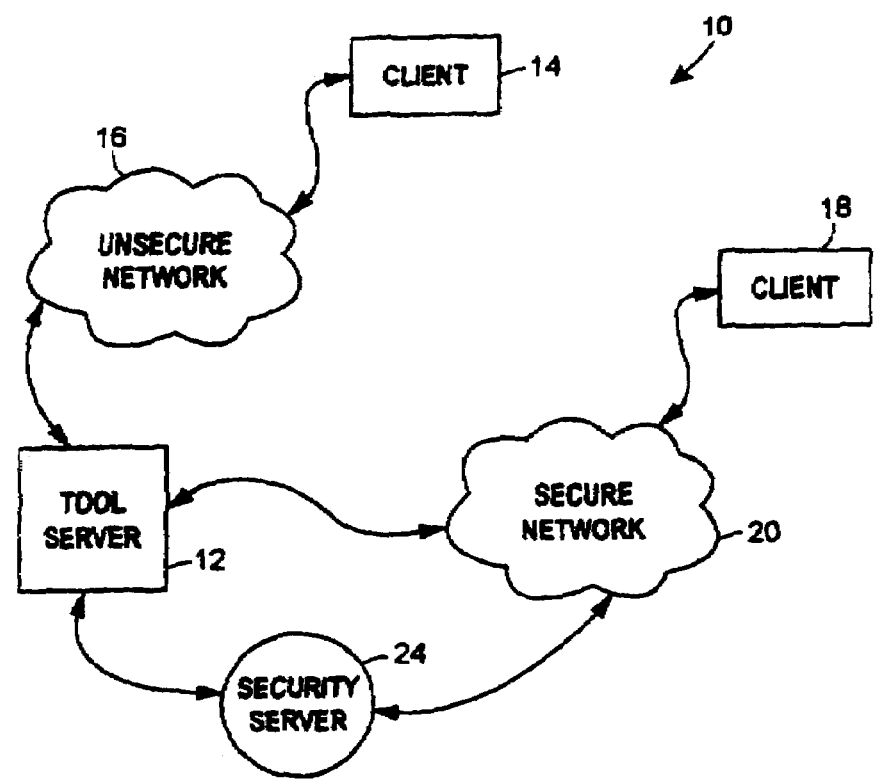
FIG. 1 is block diagram representation of a system in accordance with a preferred embodiment of the invention.

The invention is described in terms of several preferred embodiments that should be taken to be illustrative of the invention and not limiting thereof. For example, the invention is described in terms of a system and method adapted to utilize the Internet as a medium for providing information and data management and sharing between diverse project team members. That is to say, the project team members may be part of diverse functional organizations within one or more larger organizations, may be geographically separated, or may utilize differing information management tools to perform their work activities. Moreover, while the information and data described in connection with the preferred embodiments is generally financial in nature, the invention is not limited to the management and sharing of financial information. For example, the invention may be used to manage technical information and data such as product design specifications and testing data, marketing and demographics data such as product promotion and target audience data, and the like without departing from the fair scope of the invention.

In accordance with the preferred embodiments of the invention, a system and method provide for the capture and tracking of information and data input to the system by numerous diverse team inputs. The teams may be based upon the organization of the project entity or entities (e.g., the corporate organizations) or may be organized in view of the particular project. The invention has applicability to any large project that includes multiple sub-projects having multiple and diverse sources and users of project information and data. The invention has particular application where the team members are not physically collocated.

In additional aspects of the invention, the information and data received from the many sources is presented to project participants and management in a consistent manner. For example, project information associated with particular issues or concerns is presented in a consistent format or with consistent identifiers that facilitate management review. Information and data are made readily available to the team members that use the information and data to do their work. Management is provided a consistent mechanism for disseminating information, assigning and tracking tasks and raising and responding to issues.

The system and method further provide functions in connection with the information and data such as notification on the arrival of new information or data, information and data archiving and information and data tracking and reporting functions. For example, when a document is revised, it is possible to save the document as a "New Revision." Document information, such as author, date, subject, and current revision number, as well as each version of the document, are retained in a team room environment. Thus, the team members may view the revision history of a document and/or access prior versions of the documents. The document revision information may also be used in presenting the information and data to non-team members and/or management. For example, presentation may be limited to only the latest version of a document when the document is being viewed from outside the document management function.

In addition to the information and data management features of the invention, in accordance with another preferred embodiment of the invention, these management features are combined with instant communications tools to permit real time collaboration on documents or other information and data.

It will be appreciated that the invention may be implemented as an Internet-based tool to support the project teams. Use of a wide area network, such as the Internet or an Intranet, permits team members that are geographically and time-zone separated to work with a single source of information, thus providing a highly collaborative working environment.

Many additional aspects and features of the invention will become apparent to one of ordinary skill in the art from following further detailed description of the preferred embodiments of the invention.

System Architecture

Figure 2:
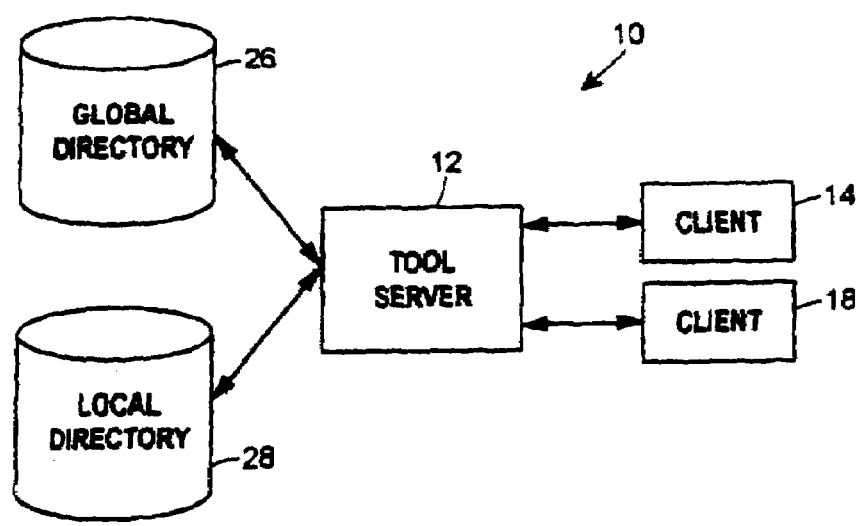
FIG. 2 is a block diagram representation further illustrating the teamwork tool illustrated in FIG. 1.

Referring to FIGS. 1 and 2 of the drawings, a system 10 for managing communications and collaborations among team members 10 includes a teamwork tool server 12. The teamwork tool server 12 is coupled to a first user or client 14 via an unsecured wide area network 16, such as the Internet. A second user or client 18 is coupled to the teamwork tool server 12 via a secured wide area or local area network 20, such as a corporate secured intranet. This allows access from secured network 16 and unsecured network 20 at the same time.

The teamwork tool server 12 may be a personal computer or other suitable server capable of supporting a web-based application written using the Lotus Domino development tools, HTML programming language, JAVA or other similar web development languages. As such, and as well known in the art, the teamwork server 12 will include a processor and associated memory and storage within which a control program that directs the operation of the processor is retained and further in which data, including documents, information, numeric data, and the like may be stored. The teamwork server 12 is also to coupled to a security server 24.

Referring more particularly to FIG. 2, the teamwork server 12 may access both a global directory 26 and a local directory 28. The global directory 26 may contain data associated with all members of a group including all possible users of the system 10, whether team members or visitor/guest users, and for each such user includes at least a user identification. The local directory 28 contains data entries associated with the particular users of the system 10, and may further utilize the user identification employed in the global directory.

Figure 3:
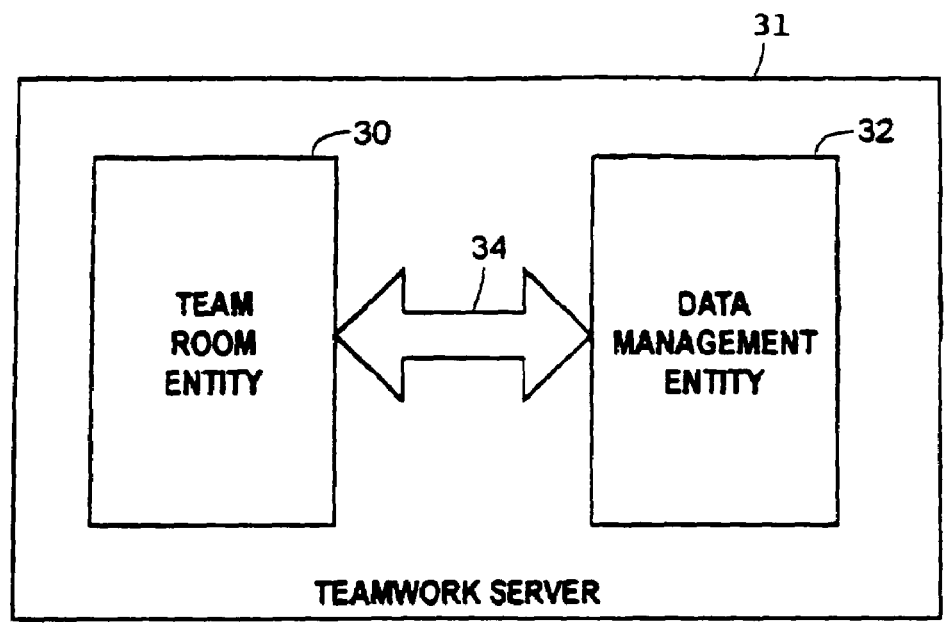
FIG. 3 is a functional block diagram of the teamwork tool illustrated in FIG. 1.

Functionally, and referring to FIG. 3, the teamwork server 12 includes a team room entity 30 and a data management entity 32. A communication link 34, such as a data bus, links the team room entity 30 and the data management entity 32 such that information may be shared and synchronized between the two entities, as will be described. Moreover, while shown implemented together on the teamwork server 12, it will be appreciated that the team room entity 30 and the data management entity 32 may be separately implemented and operated.

Team Room

Figure 4:
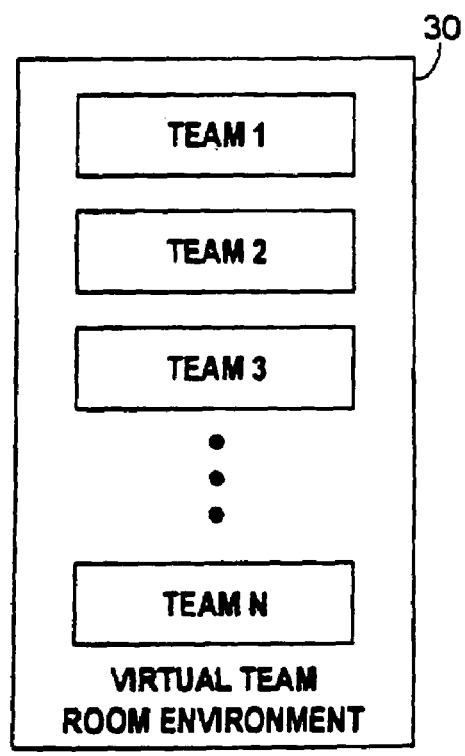
FIG. 4 is a block diagram representation of teams defined within the teamwork tool and in accordance with a preferred embodiment of the invention.

In accordance with a preferred embodiment of the invention, project participants, i.e., users of the system 10 or team members, using the team room entity 30, define one or more team rooms in a virtual environment to support the overall project. Generally a large project will be broken into smaller sub-projects and a team room environment is created for each of these sub-projects. For example, within the team room environment 31 there may be defined a number of teams, and teams 1-*n* are illustrated in FIG. 4. These virtual, team room environments are accessed through the unsecured network 16 or the secured network 20 or other networking architecture, and facilitate the sharing of information and the linking of data for diverse groups of users. That is, each team member is given access to a team room environment supporting the project or sub-project associated with that team and that the team member is involved with.

Multi-levels of access may be provided. For example, an open level access may be provided that permits access by a wide number of users to a limited selection of project information and data. A restricted level of access may be provided such that only team members, management and other authorized users may access, modify, add or delete project information and data retained within a team room. Wide access to selected project information allows everyone within the organization and included within the global directory 26 a level of participation in the project. Restricted level access to only those team members or users having a profile within the local directory 28 ensures the integrity of the information and data, as these users will be the only users with authority to enter or edit information and data within the team room environment.

The security server 24 and the local directory 28 cooperate to provide the multiple levels of access. The security server 24 is invoked upon access by a user to the teamwork server 12. The security server 24 operates to verify a user's identity based upon an entry within the global directory 26, and upon verification of such, the user may be granted access to the teamwork server 12. Within the local directory 28, associated with the user, is a user profile that defines the level of access granted to the user. For example, users unknown to the local directory 28, i.e., not having a profile, may be granted guest status within the team room environment. Team members and users of the teamwork tool are granted access according to their level of authorization. For the client 18 accessing the teamwork server 12 via the secured network 20, a verification process utilizing the security server 24 may not be required. Upon access to the secured network 20 by the client 18, the security server 24 is invoked to verify the user's identity. Access to the teamwork server 12 from the secured network 20 therefore would not require a further verification, although one may be provided if deemed necessary for security purposes.

Figure 5:
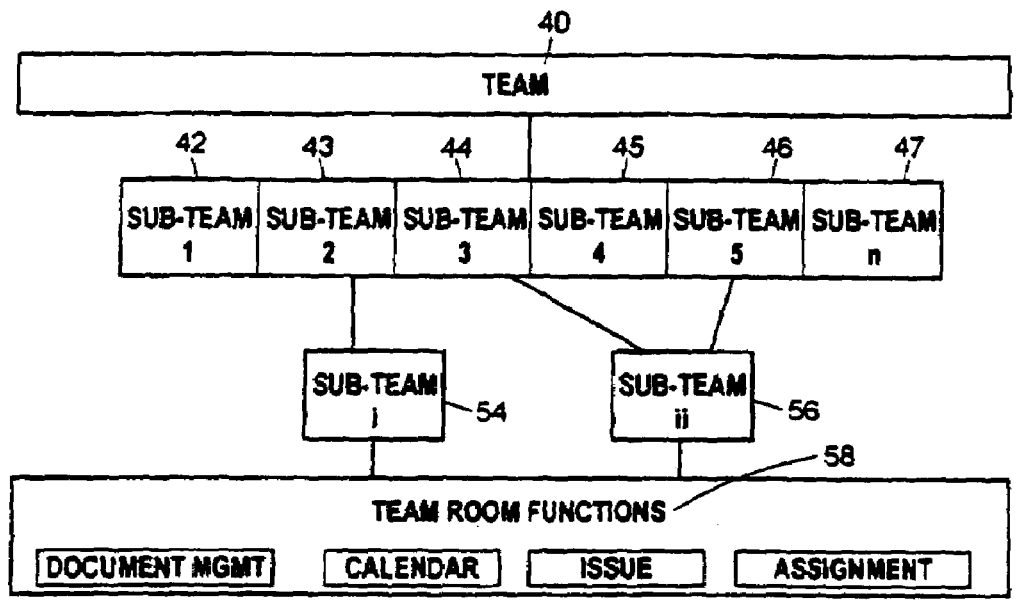
FIG. 5 is a block diagram representation of a team of the teams and sub-teams illustrated in FIG. 4.

FIG. 5 illustrates the structure of one of the teams supported by the teamwork server 12. The team 40 includes a plurality of sub-teams 42–47, which may themselves include sub-teams 54 and 56. Sub-team 54 is shown dedicated to sub-team 43 while sub-team 56 supports activities of sub-teams 44 and 46. Supporting team 40 and each of the sub-teams is a layer of team room functions 58, such as documentation management, calendar, issue, assignment, news and the like. Each team and sub-team may have its own organization separate from the organization form which the team members are drawn. For example, the organization may have a functional organization, while the team is organized by product category. Thus, the team room environment can support activities for a number of different organizational structures.

Figure 6:
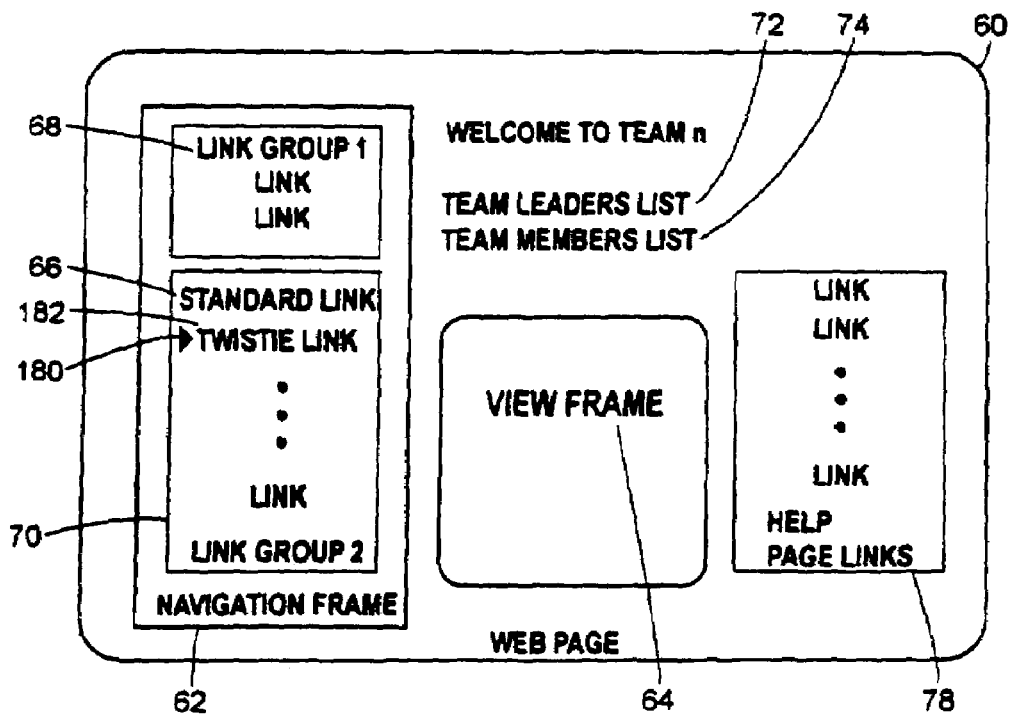
FIG. 6 is a graphic representation of a team web page in accordance with a preferred embodiment of the invention.

The environment for the team room may be configured to appear to the user as a web page. FIG. 6 illustrates an exemplary team room web page 60 configured as a home page. The page 60 is split with a navigation frame 62 disposed on a left hand side of the page 60 and a view frame 64 on the right hand side. By linking to information from the navigation frame 62, users can view the contents of those links in the view frame 64, which is generated responsive to clicking the associated link. One link is identified, for example, as link 66. The links are separated and arranged into several groups, and two groups 68 and 70 are shown in FIG. 6. Additional groups of links may be used. The purpose of separating the links by groups is to provide to particular users links that are available to them for use according to the granted level of access to the team room. For example, a team leader may have access to the first group 68 of links relating to team room administration and to the second group 70 of links relating to general team room functions. A team member may only have access to the second group 70 of links, and would not be presented with the first group 68 of links. A guest user may be presented still a third group of links associated with access permitted to guest users.

The page 60 may contain active graphics and provide team room members various pieces of information upon entering. For example, the page 60 may identify the team leaders 72 and the team members 74 and may further provide an indication of the team room members presently in the team room and available for collaboration via a chat room or other interactive environment, which may be joined or entered via another link (not depicted). The page 60 may include graphics and images within the view frame 64 and links to help pages 78. The particular arrangement of the team room home page 60 is not particular to the invention, and it should be appreciated that numerous adaptations may be created.

As noted, the links 68 and 70 allow the users to link to and view the content associated with the link. Exemplary links 70 may include a project home page link to take the user to the project home page; a team home page link to take the user back to the particular team home page and a table of contents link providing a listing of the available contents of the team room. Management, organization and information sharing links may be provided including a news link; a calendar link; a meetings link; an assignments link and a documents link.

The many purposes for the team room include being the information repository for the sub-project. This information may include meeting minutes of all types, reports and presentations, issues and calendar and news items. This information is stored within the memory and storage of the teamwork tool server 12 as documents as described more fully below. Additional information may include project or sub-project Numeric Data, assignment distribution and tracking information and team collaboration information also described more fully below.

Figure 7A:
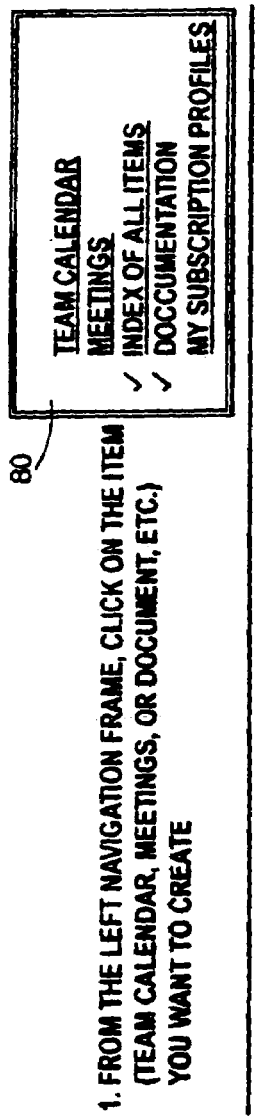
FIG. 7 is a graphic representation of a portion of the web page illustrated in FIG. 6.
Figure 7B:
Figure 7C:
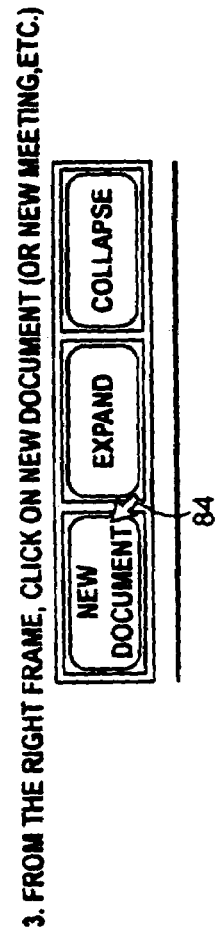

The types and format for information and data that the team room will accept is defined, e.g., a document, issue, assignment, calendar item or news. In addition, the information and data may be organized by the sub-team, category or event to which it is relevant. Definition and organization of the information and data facilitates its use and review by the team members and by visitors to the team room. Referring to FIG. 7, information is added by clicking within the navigation frame 62 on the information type that is to be created, e.g., documentation, as illustrated at 80. If there is a sub-category for the information, such is selected at 82. Finally, the new document button is selected at 84, and a new document form 86 (FIG. 8) will appear in the frame 64.

The new document form 86 is arranged to facilitate entry of various information about the new document, and it is divided into a basic information section 88, a content section 90, a reviews section 92, an active/inactive section 94 and an email notifications section 96. The basic information section includes fields for subject 100, document type 102, category 104, associated events 106 and associated sub-teams 108. The content section 90 is a general text field. The reviews section allows the team member entering the document information to identify the additional team members who will be responsible for the review of the document. The actual reviewer(s) is selected from a list 110 of potential reviewers that is restricted to particular team members or management. This ensures that documents are not widely disseminated without having first been reviewed by an authorized team member or management. Alternatively, the team itself may be designated by selecting box 113. A due date for the review may also be assigned at 112, but is not required. Advantageously, information may be communicated to the team members for informational purposes by designating the team as the reviewer and not assigning a due date. The document may be marked as active or inactive or may be set to become inactive after a predetermined period of time, 111. Ordinarily a document will be marked as active and then later edited to become inactive. Pressing the save and close button 114 does the same.

In order to preserve the currency of the information retained within the team room, an auto-deletion feature may be added to the team room functionality. After a specified amount of time, the author and/or designates of a document, issue, assignment or other item of information retained within the team room is notified that the information has become dated. At that time, the author may be requested to update the information, archive it or delete it. Absent a response from the author to one or more requests to update the information, an automatic deletion or archiving process may take place.

There exists multiple document types, and the various document types accepted are also defined. Additionally, electronic files may be deposited within the team room in the format of the application used to create them. The electronic files retained within the team room may be downloaded to the participant's local machine, e.g. the client 14 or the client 18, and read using a similar application used by the author to create the file, edited if desired and reposted to the team room for sharing. The document may be saved on the participant's local machine and transmitted via other means to non-team colleagues if desired. Threaded discussion may also take place within the team room on any document stored there.

Figure 9:
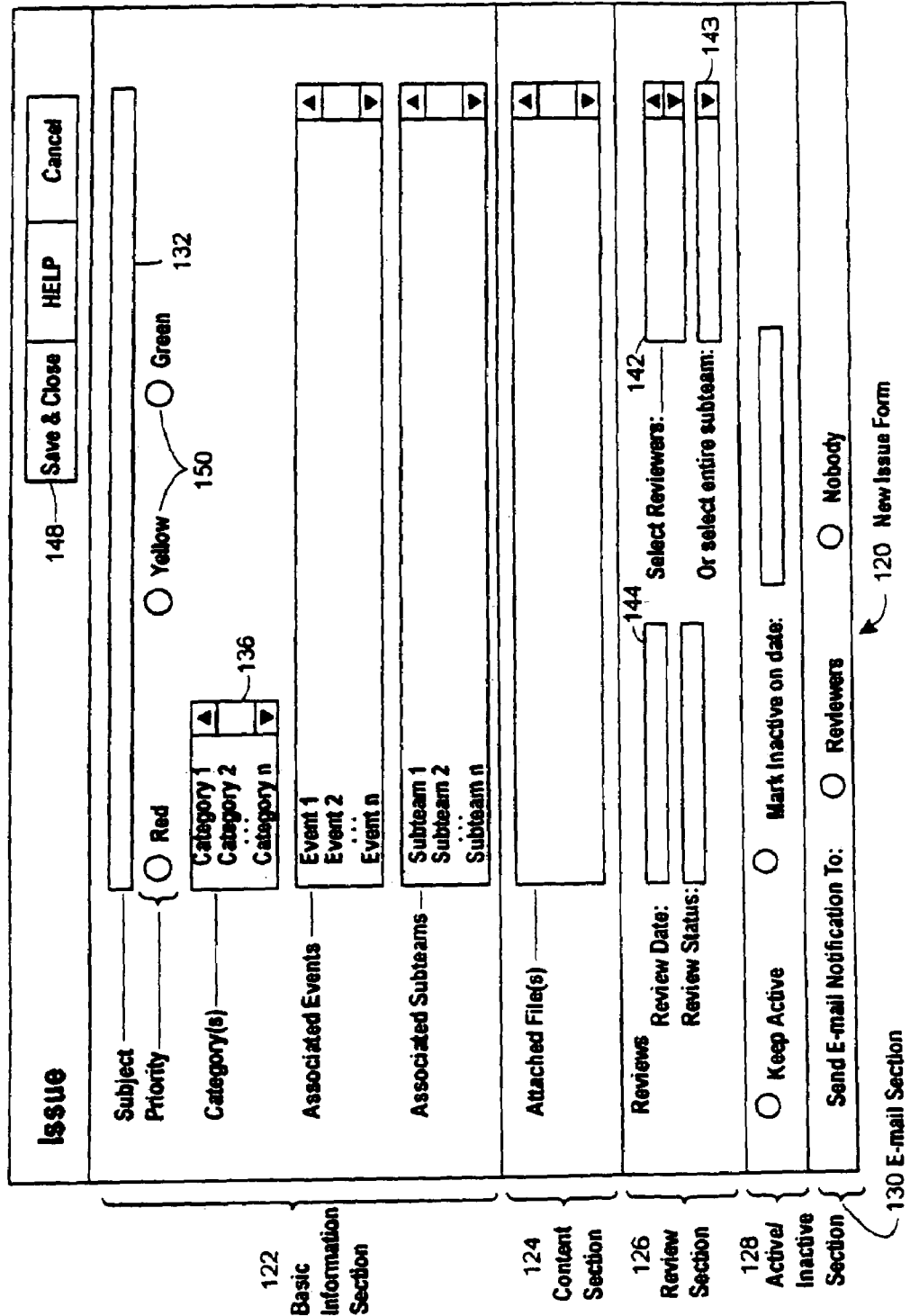
FIG. 9 is a graphic representation of a portion of a team web page associated with issue entry into a teamwork tool in accordance with a preferred embodiment of the invention.

A feature of the team room is that any team member may raise an issue at any time, and a team member does so by creating an issue (e.g., an issue document) using a procedure similar to that outlined in FIGS. 7–8, above. Upon selecting the new issue link from the navigation frame 62 to create a new issue, a new issue form 120 appears in the view frame 64 (FIG. 9). The new issue form is similarly laid out as the new document form 86, and is divided into a basic information section 122, a content section 124, a reviews section 126, an active/inactive section 128 and an email notifications section 130. The basic information section includes fields for subject 132, category 136, associated events 138 and associated sub-teams 140. The basic information section also includes a priority selection 150 for the issue. The priority may be color coded with red corresponding to high priority, yellow medium priority and green low priority, or other conventions may be used.

The content section 124 is a general text field. The reviews section allows the team member entering the issue to identify the additional team members who will be responsible for the review of the issue. The actual reviewer(s) is selected from a list 142 of potential reviewers that is restricted to particular team members or management. A due date for the review may also be assigned at 144. The issue may be marked as active or inactive. Ordinarily an issue will be marked as active and then later edited to become inactive, or expire automatically by setting an expiration date 146. Pressing the save and close button 148 does the same. Upon saving and closing the new issue form 120, if the notifications option 130 has been selected, an email notification 152 (illustrated in FIG. 10) is sent to the reviewers. The new issue document itself is not sent to the reviewer, instead a link 154 is provided in the notification 152 that takes the reviewer to the team room and the opens the issue document. In addition, additional email notifications may be provided to the issue assignor and/or assignee at later dates, and may be specified relative to the due date. Of note is that if the reviewer is not within the secured network, before being provided access to the team room and the issue, the security server 24 is invoked.

To avoid issue overload, upon raising an issue the team member must assign a reviewer, e.g., a member of the team. The reviewers may be a restricted sub-set of the team members, and for example may be the team leader(s) and/or their delegates. Until the reviewer has reviewed the issue it is not made available to all of the team members nor may it be raised to management. Since issues typically result in the making of assignments, the team room may be configured to automatically generate assignments when an issue is raised. Issues and issue-generated assignments may be distinguished from ordinary assignments either by a separate designation, or by the identification of the reviewer in association with the issue-generated assignment. Assignments may also be coded to distinguish priority. For example, an icon may be disposed adjacent the assignment, the color or shape of which identifies the importance, priority, urgency or other characteristic of the assignment.

Figure 11:
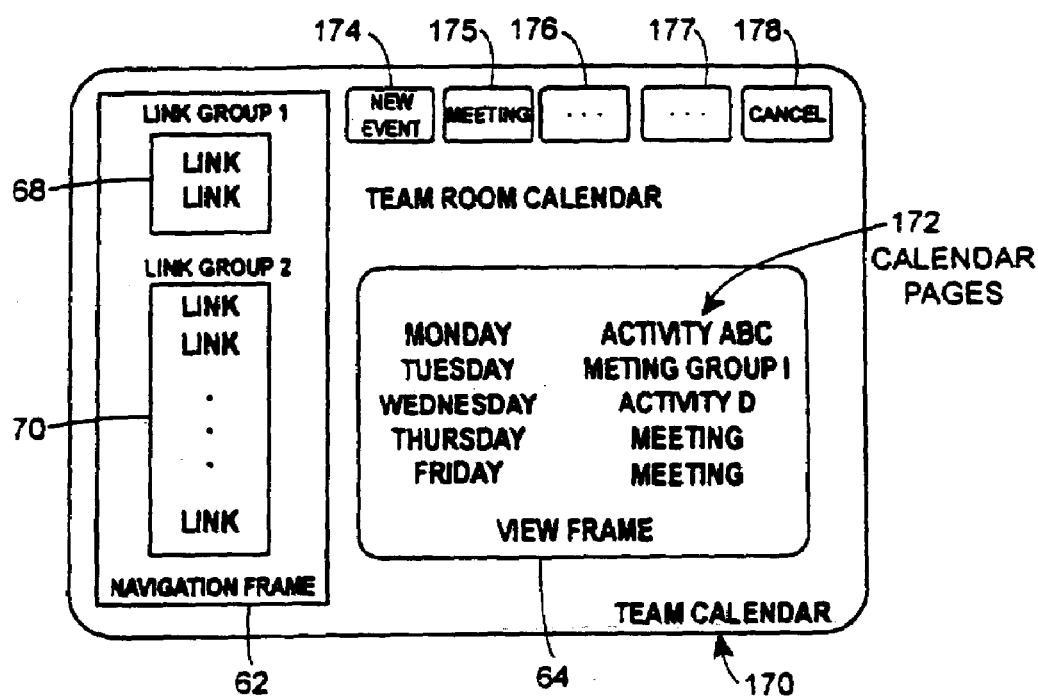
FIG. 11 is a graphic representation of a team web page associated with a calendar feature of a teamwork tool in accordance with a preferred embodiment of the invention.

Another feature of the team room is a team calendar and news function. Any team leader can add items to the team calendar, and all team members have access to the team calendar. An example of the team calendar 170 is illustrated in FIG. 11, which upon selection of the calendar link from the navigation frame 62 appears in the right frame 64. Illustrated in the view frame 64 are calendar pages 172 displayed by day, week, month or year. Across a top of the calendar pages 172 are buttons 174–178 that allow for the creation of new events, meetings, allow for manipulation of calendar display and allow access to help or cancel activities.

News items, that may added or accessed from a news link within the navigation frame 62, can be configured to be posted by any team member, or posting and editing of news items may be limited to the team leader or designates to avoid generating too many news items. Similarly, responses to news items may be limited to particular team members, but not necessarily so.

In connection with the purpose of the team room for tracking the progress of the project or sub-project, milestone events in the project may be tracked on the calendar. Similarly, news items may be linked to milestone events such that upon the passing of the milestone event the news item is automatically archived.

Figure 12:
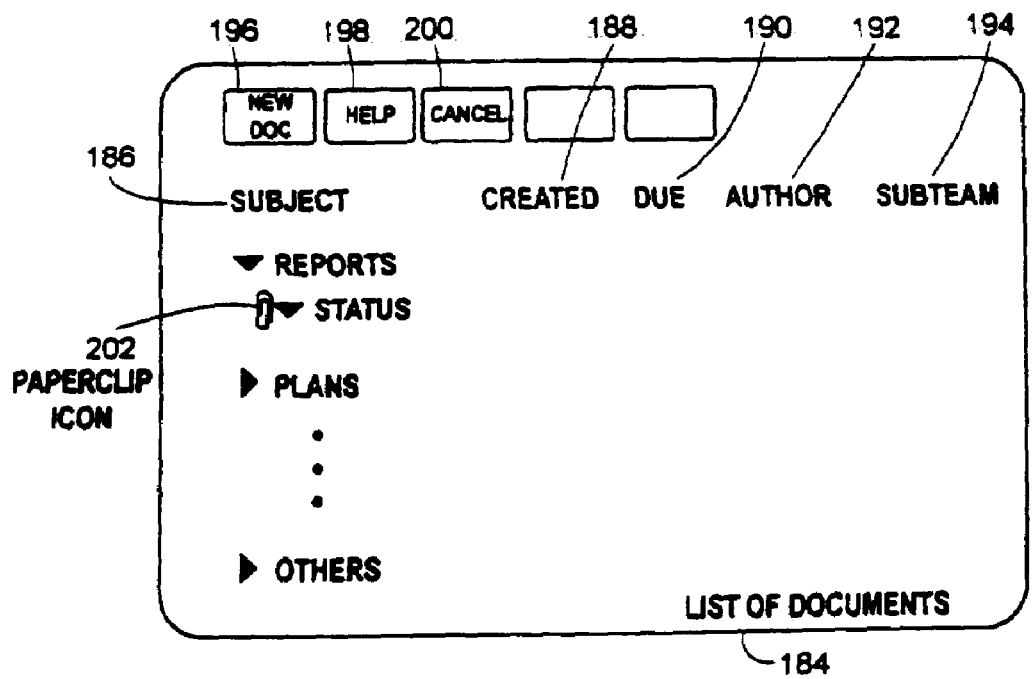
FIG. 12 is a graphic representation of a portion of a team web page associated with a document tracking feature of a teamwork tool in accordance with a preferred embodiment of the invention.

Of note from the navigation frame 62 (FIG. 6) are the twisties 180 disposed next to certain links, for example a link 182 associated with documentation. Clicking the twistie expands a list of documents 184 (FIG. 12). Under the subjects 186, the documents associated with that listed subjects are displayed. Clicking on the document within the list 184 takes the user to the document within the team room. The list 184 also provides additional information about the document such as creation date 188, the due date 190, if any, the author 192 and the associated sub-team 194. The list also permits creation of new documents via the new document button 196, and help and cancel buttons, 198 and 200, are also provided. If there are additional files or attachments associated with the document, a paperclip icon 202 appears next to the document in the list 184.

While the team room may represent a sub-project of a larger project, it is also possible for the team itself to create sub-teams (FIG. 5). Information and data, such as documents, news events, and the like, may be linked to particular sub-teams. Similarly, assignments may be linked and tracked by sub-team. The sub-team concept may be extended further to categories under each sub-team. The ultimate level of refinement will be dependant upon the complexity of the project/sub-project/sub-team/category.

While the calendar function provides a tool for tracking events, meetings, due-dates and the like, a separate posting of events and meetings provides focus for the team. For example, more attention may be drawn to critical deadlines by marking it as an event than if the event only appeared on the calendar. Preferably the event and meeting data are associated with the calendar data so that each are updated accordingly upon the passing of the particular date.

Preferably a "New" function is accessible from each page associated with the team room for adding issues, assignments, events, milestones, meetings, documents, etc. A team member would merely have to click on the "New" button to be taken to appropriate directions for entering the appropriate information and/or data.

Figure 13:
FIG. 13 is a graphic representation of a portion of a team web page associated with creation of a team room environment within a teamwork tool in accordance with a preferred embodiment of the invention.

In accordance with the preferred embodiments of the invention, the team room environment is configurable by the users of the team room. As noted in connection with the discussion associated with FIG. 6, particular team members, such as team leaders and administrators, are given access to additional links beyond those links available to general team members. One such link permits the team leader to configure the team room using a New Team Room template 220 shown in FIG. 13. The template 220 is arranged to obtain various information about the new team room, and it is divided into a basic information section 222, a team member designation section 224 and an additional information section 226. The basic information section 222 includes entries to identify the team room name, whether the team-room is a sub-team and project identification. The team member designation section 224 permits entering information associated with the team members including the user identification by which the user is identified in the global directory. The additional information section 226 permits the configuration of the team room home page, for example, adding a welcome message and further permits the identification of contact persons associated with the team room.

Method of Interfacing Team/Project Members

A team room, such as described above in connection with a preferred embodiment of the invention, allows team members in a cross-functional or diverse organization to effectively interact. The team room permits the exchange and collaborative development of information and data even where the team participants are not physically collocated. In accordance with an additional preferred embodiment of the invention, collaboration of team members is further facilitated by use of the team room concept in combination with communication capability.

In one preferred implementation of this aspect of the invention, the team room is linked with an E-mail service. Upon entry of information or data, such as tasks, documents, meeting forms, team news, etc, the team member may immediately and automatically E-mail a notification to each team member that the new information or data exists within the team room. This is accomplished by associating an email notification feature with the creation of each new document entered into the team room. The notification does not deliver the actual documents to the recipient, but instead, provides a link back to the team room such that the team room members may then enter the team room to view the new information or data, add to or modify the information or add commentary.

In another preferred implementation, the team members themselves may designate when and how they are informed that new information or data has been added to the team room. From the subscription profile link on the navigation frame 64, the team member is taken to a subscription profile form 250 illustrated in FIG. 14. The subscription profile form 250 allows the team member to provide a description of the profile 252, designate whether the profile is active 254, designate a search method 256 and identify keywords associated therewith 258, and to further designate whether or not to receive entire discussion threads 260. Similarly, the team member may specify to be informed each time there is new information or data associated with a particular author, category, event, sub-team or etc.

To further take advantage of the collaborative features of the team room, it may also be linked with a real time communication application. For example, the team room may be linked with the Microsoft NetMeeting application or the Lotus Sametime application. More simply, the team room may be linked with a chat room environment feature. In this manner, online real time meetings of team members with real time collaboration on documents or virtually any information or data retained within the team room can occur. The participants need not be physically collocated and the integration of information and data occurs in real time, on-line. Moreover, a reliable version of the information will be in existence, and will be available for every team member's use.

Figure 21:
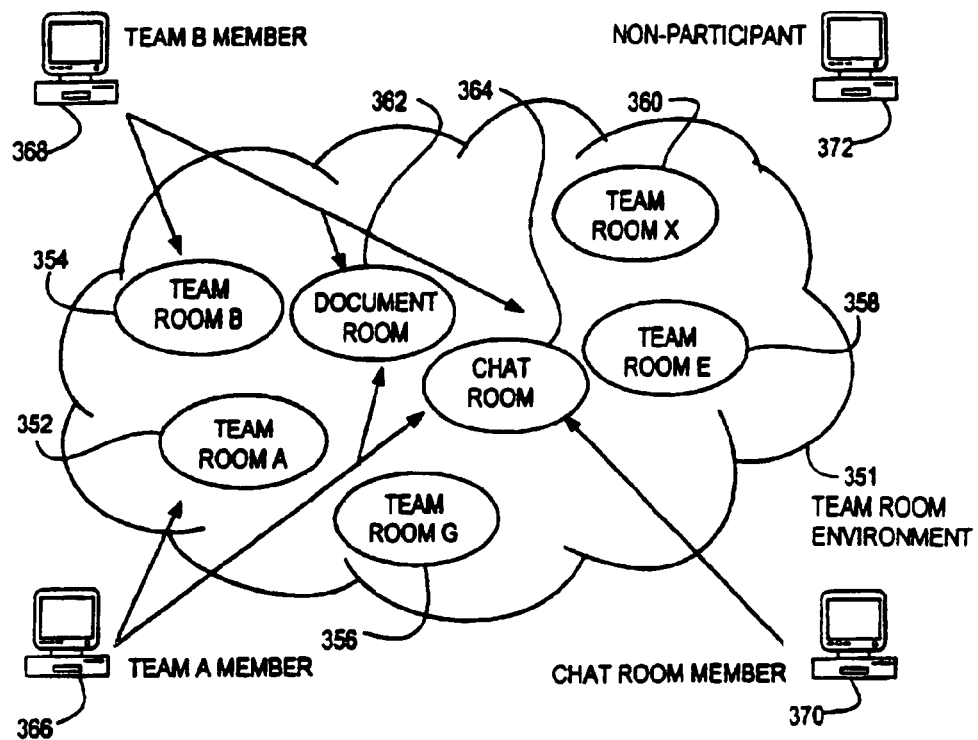
FIG. 21 is a graphic representation of team interaction within a team room environment in accordance with a preferred embodiment of the invention.

Referring to FIG. 21, within a team room environment 351, there is defined team rooms, respectively identified team rooms 352–360, a document room 362 and a chat room 364. The team rooms may be defined as described above. The document room may be room defined specifically to facilitate document collaboration between team members, while the chat room 364 may be just that, a room that allows the team members to enter and exchange thoughts and ideas. A first team member 366 is linked to and participating in team rooms 352, document room 362 and chat room 364. A second team member 368 is linked to and participating in team rooms 354, document room 362 and chat room 364. A non-team member 370 may be linked only to the chat room, and a non-participant member 372 is not linked to the team room environment 351.

Figure 22:
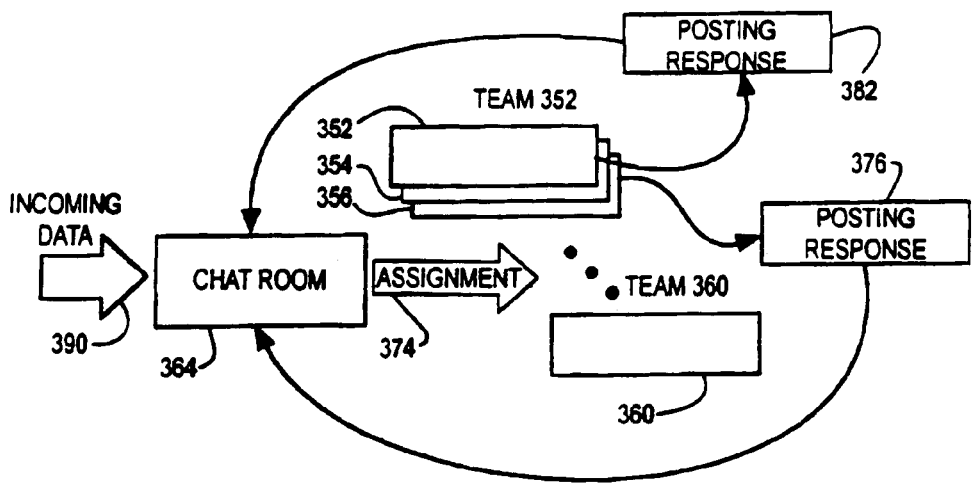
FIG. 22 is a graphic representation of team interaction within a team room environment in accordance with an additional preferred embodiment of the invention.

Referring to FIG. 22, the team members 366 and 368 and non-team member 370 input information 390, i.e., thoughts ideas, documents, etc., into the chat room 364. Within the chat room 364 team member 366, for example, may create a task, raise an issue or have a question but is uncertain to which team it should be directed. From the chat room 364, the task, issue or question (issue) 374 is assigned to any combination of each of the teams 352–360. The team leaders, respectively, can then respond to the issue. For example, the team leader of team 354 may provide a response 376, indicating that the issue 374 is not one for which it has responsibility. This action causes a notification to the original requestor, the other assignees and a posting 378 to the chat room 364. The team leader for team 356 may provide a response 380, indicating that team 356 is responsible for the request, and may provide an answer. This action causes a notification to the original requestor and the other assignees and a posting 382 to the chat room 364. Numerous other interactions may be contemplated.

Method and Apparatus for Organizing, Supporting and Managing a Project

As facilitated by the preferred embodiments of the invention, a project may be supported by team members designated from various entities of cross-functional or diverse organizations. This is true even where the team members are significantly separated geographically. The team room environment described above provides a tool that permits these team members to organize, manage and track data and to collaborate. To further facilitate the project, the data collection entity 32 of the teamwork tool server 12 (FIG. 3) provides a numeric data tracking and collection process.

In accordance with a preferred embodiment of the invention the project or sub-project itself is defined by a project Roadmap. The project Roadmap is a collection of physical action descriptions (PADs) that, as the name suggests, each describe a single discrete action or activity that must be completed by the team in order to complete the project. Not so literal, however, a PAD can be defined for virtually any discrete aspect of the project whether it is a physical task, the occurrence of an event, or some other criteria that relates to the successful outcome of the project. Illustrated in FIG. 15, a physical action description 270 is associated to a number of reporting cycles or periods 272–284. For example, data associated with the physical action description 270 is recorded by years. The data collection entity 32 facilitates the definition of the PADs and the corresponding collection and reporting of the data.

Figure 16:
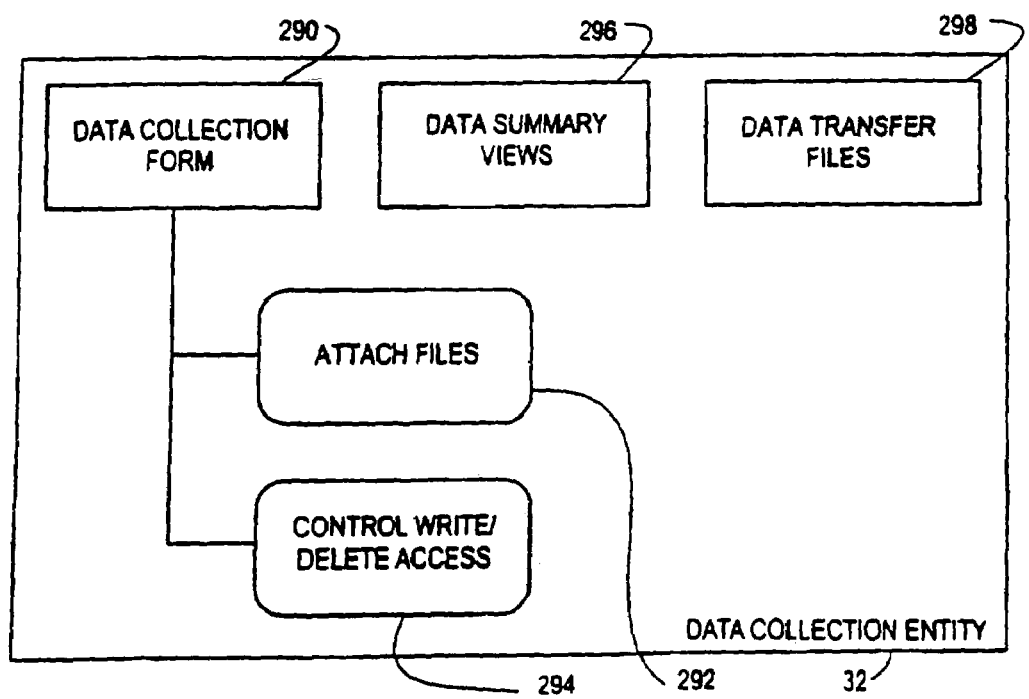
FIG. 16 is a block diagram representation of a physical activity description and associated reporting elements within a teamwork tool in accordance with a preferred embodiment of the invention.

Referring now to FIG. 16, the data collection entity 32 includes a data collection function 290 including an attach files function 292 and an access control function 294. The data collection entity 32 also includes a data transfer files function 298, which provides utility functions for the import/export of data from the data collection entity 32.

Data collection begins with the definition of the PAD, and FIG. 17 illustrates a template 300 for defining a PAD. The template 300 is arranged to facilitate the collection of certain information, including an indication of how the data is to be used, i.e., whether the data is to be included during reporting or not, 302, the associated project 304 and/or sub-project, 304 and 306, respectively, the name of the PAD, 308, the description of the PAD 310, the action implementation event, i.e., the milestone that allows one to know the physical action has been completed, 312, the date for completion, 314, an assessment of the difficulty of implementation, 316, the status of the implementation, 318, the required approvals, 320, and whether the information is to be recorded against the associated project or another project, 322.

The Roadmap(s) for a sub-project, and the PADs associated therewith, are preferably linked to and accessed from the team room, and as shown in FIG. 3, may be co-located within the teamwork tool server 12 and linked via the bus 34. In fact, the team members define the Roadmap by defining the PADs. The team rooms are preferably linked to the overall project, and at higher levels within the organization, all of the Roadmaps may be viewed by authorized users. For example, all of the team rooms may be linked under a common web site for the overall project, while specific team room home pages are created to support the team room environment.

Figure 15:
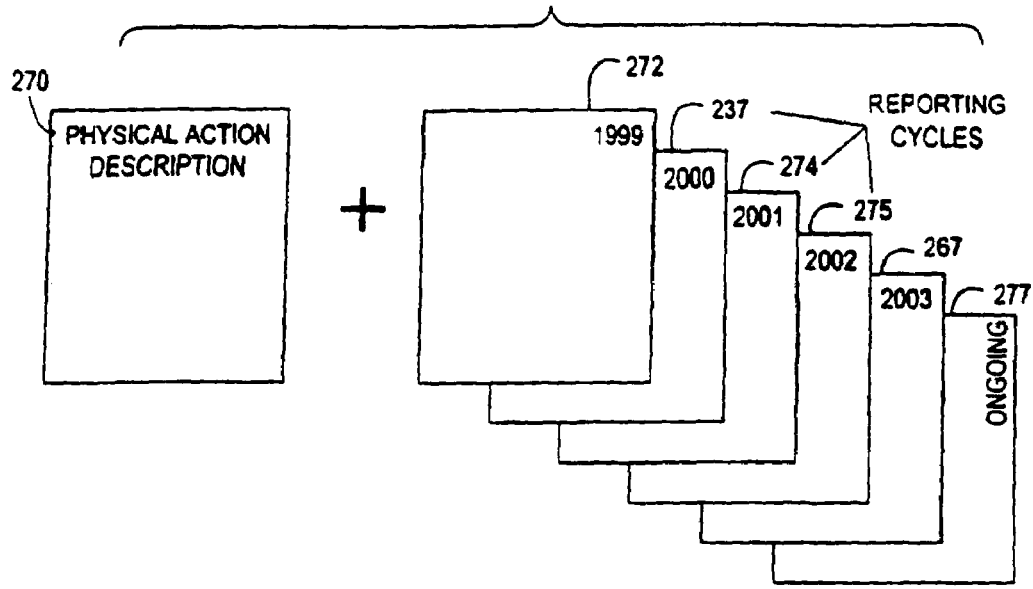
FIG. 15 is a block diagram representation of a data entry entity within a teamwork tool in accordance with a preferred embodiment of the invention.
Figure 18:
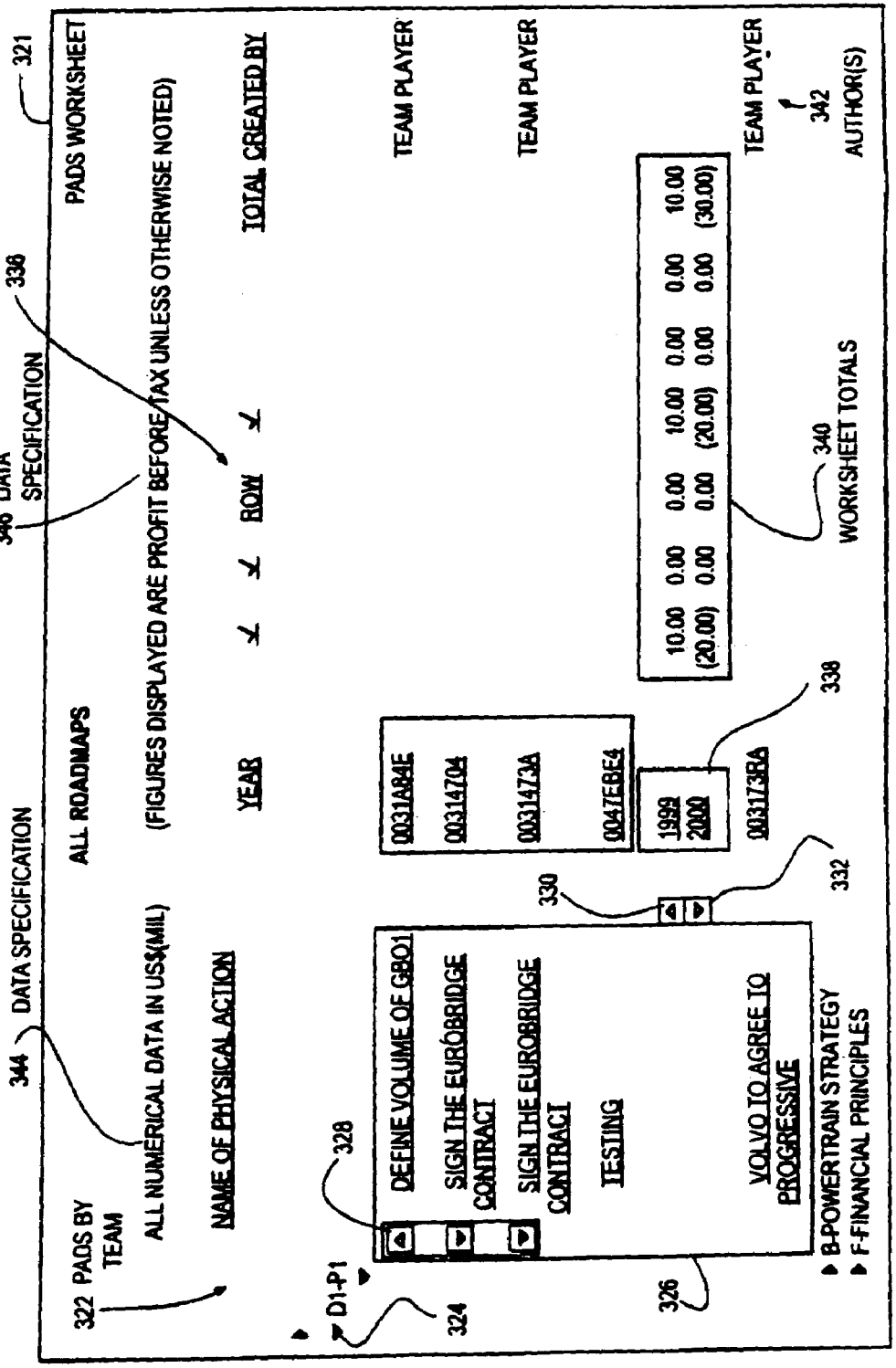
FIG. 18 is a graphic representation of a portion of team web page associated with the entering of data into the teamwork tool in accordance with a preferred embodiment of the invention.

In the example shown in FIG. 15, the physical action description is tied to the years in which financial results are reported or "booked." Data may also be specified to a particular team or sub-team, or to a particular hierarchy of teams/sub-teams according to the hierarchy of the team room. Data is entered by PAD and by year using a data entry form or worksheet 321 shown in FIG. 18 generated by the data collection form function 290 of the data collection entity 32. Referring to FIG. 18, the worksheet 321 includes a portion 322 identifying the various PADs by teams. Associated with each team is a twistie, one shown as twistie 324, that expands a list 326 of PADs for that team. Adjacent the PAD in the list is an icon 328 that is used to provide information about the PAD. In the financial example presented, a book icon may represent that the financial information for the PAD is being booked to a different project than the one particularly identified with the PAD. Additional icons 330, such as a pencil and pad icon or a check mark icon, respectively indicate that the worksheet is in progress or is ready for review. In addition to the PAD name, 332, the PADs may be identified by a unique identification number 334. As described in this example, data is entered by year, it may also be entered by various other divisions, such as organizational groups 336. The years are identified at 338 and the worksheet totals are listed at 340. Also listed on the worksheet are the team members 342 responsible for creating the worksheet and entering the data.

The worksheet 321 provides a common format by which all teams associated with the project are required to enter data. The worksheet may include specifications 344 and 346 for the data, and also includes an ability, via the attach files function 292, to attached supporting documentation in the form of electronic files. The worksheet data and the supporting files are then stored within the data collection entity 32. Once the worksheet 321 is completed and released for review, the control write/delete access function 294 limits all but particularly authorized team members from changing the data.

The data summary views function 296 permits authorized team members or guests to view the data associated with the PADs. The data may be view in several report forms, and a report form 350 is illustrated in FIG. 19. The report 350 provides a summary by project teams 1-n by organizational group 336. By clicking on one of the project teams, a list expands to present the PADs associated with the selected project team, and the reviewer may further drill down into the data by clicking on twisties, to get to the form 352 illustrated in FIG. 20, where for a particular team, and for a particular PAD, the data by organizational group 336 is shown. The icons 328 are again used to provide information about the data presented, such as the book icon to inform that the data is being booked to a different project. One of ordinary skill in the art will appreciate that the data may be sorted and report in virtually a limitless number of ways. Several examples have been presented herein to illustrate the flexibility of the invention in the management of the data and in the association of data with the activities of various teams supporting a project. At a glance of the report, a user may understand a number of characteristics of the data and the teams that generated the data.

As previously noted, in the preferred embodiment of the invention, the Roadmaps, and associated PADs, are integrated with the team room concept. The team members therefore define the Roadmaps via that: team room, and the team room facilitates entry of information and data into the PADs. Using the on-line collaboration feature, team members may discuss, comment, and finally integrate and agree on the data represented on the Roadmap.

Method and Apparatus of Integrating Information Management Systems

It is frequently necessary to share information and data between separate organizations. For example, where two corporations join together in a joint venture, it may be necessary for respective employees of each corporation to share and collaborate on information and data. In accordance with the preferred embodiments of the invention, a team room environment is established to support the project.

The team room may be established within either of the organization's information management systems, e.g., as part of either organization's Intranet. Security issues, however, may dictate against such an implementation. Alternatively, the team room may be established as part of secure web page environment on the Internet. In such an arrangement the team members would access the team room via the Internet and following an appropriate security logon to the secure area. The function and features of the team room are preferably as described above, although it will be appreciated that more of less functionality may be provided without departing from the fair scope of the invention.

Implementations

The preferred embodiments of the invention described herein relate to a web-based tool for providing for the managing of communications, information and facilitating collaboration among team members. The invention may therefore be implemented using suitable Internet based computer programming techniques, for example, using the Java programming language or HTML programming elements. It may also be advantageous to leverage and utilize existing data management tools, such as the Lotus Domino application, and provide thereto the additional functions and capabilities described herein.

The foregoing invention has been described in terms of several preferred embodiments that are intended to be illustrative of the broad aspects of the invention. One of ordinary skill in the art will appreciate that the invention may be otherwise embodied without departing from the fair scope of the invention.

We claim:

1. A method of collaborating among team members of separate diverse organizations over a first electronic network and a second electronic network, the diverse organizations including first members of a first organization and second members of a second organization diverse from the first members, the method comprising:

providing a virtual team environment supported on a team room environment server, the team room environment server being coupled to each of the first electronic network and the second electronic network;

permitting access to the virtual team room environment to first team members via the first electronic network only if the first team members are identified in a directory associated with the first electronic network;

permitting access to the virtual team room environment to second team members via the second electronic network only if the second team members are identified in a directory associated with the virtual team room environment;

defining a team room within the virtual team room environment;

associating a plurality of the first members and a plurality of the second members with the team room;

assigning a review authority to one or more of the team members in the pluralities of first and second team members;

defining a plurality of activities associated with a project roadmap, wherein each activity includes an activity description and wherein each activity is associated with the team room;

receiving data from the first team members and the second team members via the virtual team room environment;

transmitting the data to at least one of the one or more team members having review authority for review and approval; and receiving approval from the at least one of the one or more team members having review authority prior to associating the data with one or more of the activities.

2. The method of claim 1, wherein the first electronic network comprises a local area network.

3. The method of claim 1, wherein the first electronic network comprises an Intranet.

4. The method of claim 1, wherein the second electronic network comprises an unsecured network.

5. The method of claim 4, wherein the unsecured network comprises the Internet.

6. The method of claim 1, wherein the information includes identification of at least one team leader.

7. The method of claim 1, wherein the information includes identification of a team purpose.

8. The method of claim 1, wherein the information includes identification of sub-teams associated with the virtual team room.

9. A method of providing communication and collaboration among team members, wherein the team members include first members of a first group of members and second members of a second group of members, organizational disparate from the first members, the method comprising the steps of:

providing a teamwork tool server supporting a team room environment, the teamwork tool server being coupled to the first members via a first network structure and to the second members by a second network structure, the team room environment including one or more activities for which communication and collaboration among team members is provided;

providing a global directory coupled to the teamwork tool server including an identification for each of the first members and the second members;

providing a local directory coupled to the teamwork tool server, the local directory including a team room user profile for each of a plurality of team room members defined by the one or more activities, wherein the team room members are selected from the first members and the second members, wherein the team room user profile includes review authority for one or more of the team members in the pluralities of first and second team members;

receiving a request for access to the team room environment with respect to the one or more activities from one user of the first members and the second members;

verifying an identification for the one user in the global directory;

permitting the request for access to the team room environment according the team room user profile for the one user;

receiving data from the one user via the team room environment;

transmitting the data to at least one of the one or more team members having review authority for review and approval; and receiving approval from the at least one of the one or more team members having review authority prior to associating the data with one or more of the activities.

10. The method of claim 9, comprising accepting from the team members information and data.

11. The method of claim 10, wherein the information comprises one of document information, issue information, task information, meeting information, calendar information and milestone information.

12. The method of claim 9, wherein the teamwork tool server is coupled to a security server, and wherein the step of verifying an identification is completed by the security server.

13. The method of claim 9, further comprising the steps of accepting information from the team members, and defining a structure of the team room environment in accordance with the information.

14. The method of claim 13, wherein the information comprises identification of a team leader and a team member.

15. The method of claim 13, wherein the information is retained in the local directory.

16. The method of claim 13, wherein the information comprises association information, the association information defining an association between the team room environment and a project.

17. The method of claim 9, wherein the first network structure and the second network structure each comprises one of an unsecured network and a secured network.

18. The method of claim 17, wherein the unsecured network comprises the Internet.

19. The method of claim 17, wherein the secured network comprises local area network.

20. A method of providing communication and collaboration among team members and non-team members, wherein the team members include first members of a first group of members and the non-team members include second members of a second group of members, organizationally disparate from the first members, the method comprising the steps of:

providing a teamwork tool server supporting a team room environment, the teamwork tool server being coupled to the first members via a first network structure and to the second members by a second network structure for providing access to the team room environment by each of the team members and the non-team members;

providing within the team room environment a team room and a second collaboration environment;

permitting access by the first members to the team room and the second collaboration environment;

permitting access by the second members only to the second collaboration environment;

associating a plurality of the first members and a plurality of the second members with the team room;

assigning a review authority to one or more of the team members in the pluralities of first and second team members;

defining a plurality of activities associated with a project roadmap, wherein each activity includes an activity description and wherein each activity is associated with the team room;

receiving data from the first team members and the second team members via the virtual team room environment;

transmitting the data to at least one of the one or more team members having review authority for review and approval; and receiving approval from the at least one of the one or more team members having review authority prior to associating the data with one or more of the activities.

21. The method of claim 20, wherein the second collaboration environment comprises one of a document room and a chat room.

22. The method of claim 20, wherein the first network structure and the second network structure each comprises one of an unsecured network and a secured network.

23. The method of claim 22, wherein the unsecured network comprises the Internet.

24. The method of claim 22, wherein the secured network comprises local area network.

* * * * *